United States Patent [19]
Girard et al.

[11] Patent Number: 5,914,835
[45] Date of Patent: Jun. 22, 1999

[54] HEAD SUSPENSION WITH MODIFIED SPRING REGION FOR IMPROVED LOAD CONTROL

[75] Inventors: Mark T. Girard, Hutchinson; John H. Tangren, St. Paul, both of Minn.

[73] Assignee: Hutchinson Technology, Inc., Hutchinson, Minn.

[21] Appl. No.: 08/936,246

[22] Filed: Sep. 24, 1997

Related U.S. Application Data

[60] Provisional application No. 60/014,605, Mar. 29, 1996.
[51] Int. Cl.$^6$ ........................................................ G11B 5/48
[52] U.S. Cl. ............................................................ 360/104
[58] Field of Search .............................................. 360/104

[56] References Cited

U.S. PATENT DOCUMENTS

| | | |
|---|---|---|
| 5,065,268 | 11/1991 | Hagen . |
| 5,126,904 | 6/1992 | Sakurai . |
| 5,185,683 | 2/1993 | Oberg et al. . |
| 5,299,081 | 3/1994 | Hatch et al. . |
| 5,353,181 | 10/1994 | Frater et al. ............... 360/104 |
| 5,461,525 | 10/1995 | Christianson et al. . |
| 5,471,734 | 12/1995 | Hatch et al. . |

FOREIGN PATENT DOCUMENTS

| | | |
|---|---|---|
| 58-88873 | 5/1983 | Japan . |
| 59-213066 | 12/1984 | Japan . |
| 60-136979 | 7/1985 | Japan . |
| 63-144475 | 6/1988 | Japan . |
| 63-213179 | 9/1988 | Japan . |
| 2-162583 | 6/1990 | Japan . |
| 2-306417 | 12/1990 | Japan . |
| 4-212763 | 8/1992 | Japan . |
| 4-285776 | 10/1992 | Japan . |
| 4-291066 | 10/1992 | Japan . |

*Primary Examiner*—A. J. Heinz
*Attorney, Agent, or Firm*—Faegre & Benson, LLP.

[57] ABSTRACT

A head suspension for use in a rigid disk drive is provided having an improved load control as provided by its spring region for decoupling the effect of loading from torsion resonance performance and for reducing the load loss caused by backbending. The head suspension includes a load beam having an actuator mounting region, a rigid section, a flexure including a slider bond pad, and a spring region between the actuator mounting region and the rigid section, the spring region having a hinge line defined across its transverse width positioned to permit the offset height to varied from its predetermined position without substantially changing the longitudinal profile of the head suspension. The hinge line is preferably provided substantially at an interface of the actuator mounting region and the spring region to provide the decoupling function. The hinge line preferably comprises a trough partially through the thickness of the material of the spring region and extending completely across the spring region is preferred, which independently reduces load loss associated with backbending of the bend within the spring region. One or more additional partial thickness troughs may also be provided within the spring region for defining the loaded profile of the head suspension for optimizing resonance performance and for further reducing load loss.

13 Claims, 17 Drawing Sheets

HEAD SUSPENSION WITH MODIFIED SPRING REGION FOR IMPROVED LOAD CONTROL

This application claims the benefit of U.S. Provisional Application No. 60/014,605, filed Mar. 29, 1996.

TECHNICAL FIELD

The present invention is directed to a head suspension for supporting a head slider within a rigid disk drive or other similar dynamic drive. More specifically, the present invention is directed to a head suspension with a modified spring or radius region for improving load related characteristics, in particular, for decoupling the effects of resonance performance from gram loading and reducing load loss caused by backbending.

BACKGROUND OF THE INVENTION

Information storage devices typically include a head for reading and/or writing data onto the storage medium, such as a disk within a rigid disk drive. An actuator mechanism is used for positioning the head at specific locations or tracks in accordance with the disk drive usage. Linear and rotary actuators are known based on the manner of movement of the head. Head suspensions are provided between the actuator and the head and support the head in proper orientation relative to the disk surface.

In a rigid disk drive, head suspensions are provided which support a read/write head to "fly" over the surface of the rigid disk when it is spinning. Specifically, the head is typically located on a slider having an aerodynamic design so that the slider flies on an air bearing generated by the spinning disk. In order to establish the fly height, the head suspension is also provided with a spring force counteracting the aerodynamic lift force.

A head suspension of the type used in a rigid disk drive comprises a load beam and a flexure to which the slider is to be mounted. Load beams normally have an actuator mounting portion, a rigid section, and a spring region between the actuator mounting region and the rigid section for providing the aforementioned spring force. The flexure is provided at the distal end of the load beam to which the slider is mounted and permits pitch and roll movements of the slider to follow disk surface fluctuations. Flexures are known that are integrated into the design of the load beam and those formed as a separate element fixed to the rigid region of the load beam.

In providing the spring force to the rigid section of the load beam for counteracting the aerodynamic lift force against a slider, a preformed bend or radius is made in the spring region of the load beam. The radius provides the spring force and thus a desired gram loading to the slider for a predetermined offset height, the offset height being a measurement of the distance between the mounting height of the head suspension and the slider at "fly" height. Constraints of the drive design, including the spacing of the disks within the drive, factor into the predetermined offset height. In any case, the gram load at the offset height provides the counteracting force to the aerodynamic lift force to establish the "fly" height of the slider above a disk surface. As used hereinafter, the term "loaded" head suspension means the head suspension combined with the slider at "fly" height and in equilibrium under the influence of the aerodynamic lift force and the oppositely acting spring force.

The radius area of the spring region is not only responsible for loading, but has also been determined to have a large impact on torsional resonance characteristics of the head suspension. Resonance frequencies of the head suspension, if not controlled, can lead to off-track error within such a disk drive. Head suspensions are designed to optimize performance even at resonance frequencies, which include a lateral bending mode and torsional modes. More particularly, it is a design criteria to reduce or eliminate the movement or gain of the head at the resonance frequencies of the head suspension. The head suspension is also designed to have certain resonance frequencies higher than the vibrations experienced in the disk drive application.

Analysis has shown that the longitudinal side profile, hereinafter "profile" of the head suspension in a loaded state has a great influence on the off-track motion caused by the torsion modes. Thus, the performance of the head suspension at torsional resonance frequencies can be optimized by controlling the profile. The profile is largely controlled by the design of the radius within the spring region of the load beam. Techniques for optimizing the head suspension profile by specifically designing the spring region of a load beam are disclosed, for example, in U.S. Pat. No. 5,065,268 to Hagen and U.S. Pat. No. 5,471,734 to Hatch et al. Moreover, in order to properly design the radius area and spring region for optimal resonance performance, it is clearly recognized that the design must also account for the desired load to be generated by the spring region so as to define the appropriate "fly" height. Thus, a variation of the radius within the spring region that may be made to change a desired loading will also change the profile of the head suspension and thus its torsion resonance characteristics. Likewise, changes made to optimize torsion resonance characteristics affect the load provided by the spring region.

Head suspensions are designed and manufactured to perform with desired specifications for each particular application within a disk drive. Such specifications typically include the load necessary to establish the desired fly height combined with the performance characteristics which can further depend on disk spacing, storage densities and disk sizes. With a given load, the radius of the spring region of the head suspension is preferably also optimized for performance so as to minimize the effects of torsion resonance.

However, even with manufacturing the head suspensions with very close tolerances, other factors may affect the ultimate performance of the head suspension that depend largely on the assembly into the particular application. Handling of the head suspension after production can slightly change its characteristics. Likewise, variations, including manufacturing tolerances within the disk drive manufacture and/or assembly may affect the head suspension performance. For example, the spacing between disks may be slightly varied. Thus, factors beyond the control of the manufacture of the head suspension may necessitate minor adjustments to the head suspension after manufacture. The load may need adjusting because of spacing variations, which would be accomplished by changing the bend of the radius area of the spring region. What this also does, however, is affect resonance characteristics, particularly, the torsion resonance characteristics.

Head suspensions are also susceptible to being slightly altered in the handling and assembly of one or more such head suspensions within the disk drive. Typically, a plurality of head suspensions that have been combined with sliders are connected in a stack or E-block and comb structure for transport and connection to the actuator assembly of the disk drive. In this structure, the stack of head suspensions and sliders are lifted and held in that position until the plurality of sliders, as connected with the head suspensions, are interleaved between the corresponding disk stack of a rigid disk drive. Slight plastic deformation of the head suspension may result from this backbending which can again affect the load provided by the head suspension as well as its torsion resonance characteristics. The loss in load force as referred to throughout this application is defined as "load loss." Moreover, since this load loss can occur at the final stage of assembly, performance characteristics of the head suspension(s) can be ultimately affected. That is, the load may be slightly off and the resonance performance may no longer be optimal.

SUMMARY OF THE INVENTION

In accordance with the present invention, a head suspension is provided having an improved load control as provided by its spring region for decoupling the effect of loading from torsion resonance performance and for reducing load loss. By the present invention, adjustments to load from its predetermined load can be made without substantial affect on profile and thus torsion resonance characteristics. Moreover, even when the head suspension in accordance with the present invention is subjected to undesirable backbending, the load loss associated with such backbend is reduced.

Decoupling of the resonance characteristics of the head suspension from the loading allows for reloading or load adjustment of the head suspension without significantly changing its resonance performance. Decoupling also means that the resonance performance can be optimized independent of the load and offset height of the head suspension. Offset height is defined as the vertical distance between the base plate and a slider mounting surface of the slider bond pad of the head suspension in the loaded state.

The aforementioned advantages are achieved by a head suspension comprising a load beam having an actuator mounting region, a rigid section, a flexure including a slider bond pad, and a spring region between the actuator mounting region and the rigid section, the spring region having a hinge line defined across its transverse width positioned to permit the offset height to be varied from its predetermined position without substantially changing the longitudinal profile of the head suspension. The hinge line is preferably provided substantially at an interface of the actuator mounting region and the spring region to provide the decoupling function. The hinge line may comprise any structure that functionally provides for a controlled hinging of the head suspension at the desired point along its longitudinal length. A sharp crease or small radius bend can be used, for example, but, a trough partially through the thickness of the material of the spring region and extending completely across the spring region is preferred. An additional advantage of a trough extending the entire width of the spring region is a reduction in load loss associated with backbending of the bend within the spring region. One or more additional partial thickness troughs may also be provided within the spring region for defining the loaded profile of the head suspension for optimizing resonance performance and for further reducing load loss.

A second aspect of the present invention is the provision of a partial thickness trough extending completely across the spring region of a load beam for the purpose of reducing load loss associated with backbending of the bend within the spring region without regard to its positioning for decoupling loading and profile. Plural partial thickness troughs can be provided having a cumulative affect in reducing load loss. An additional advantage of partial thickness troughs is the ability to provide head suspensions with lower spring rates.

BRIEF DESCRIPTION OF THE DRAWINGS

A detailed description of the preferred embodiments in accordance with the present invention are described below with reference made to the accompanying drawings in which.

DETAILED DESCRIPTION OF THE PREFERRED EMBODIMENTS

Figure 1:
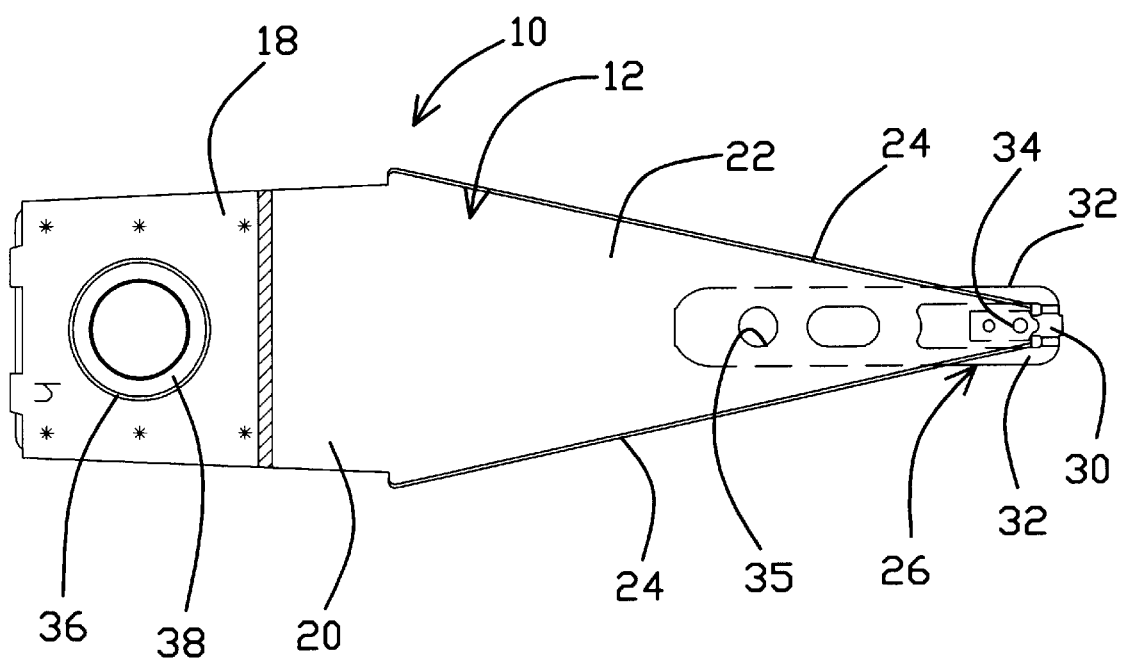
FIG. 1 is a top view of a head suspension in accordance with the present invention including a single partial etched trough traversing the spring region for defining a hinge line.
Figure 2:
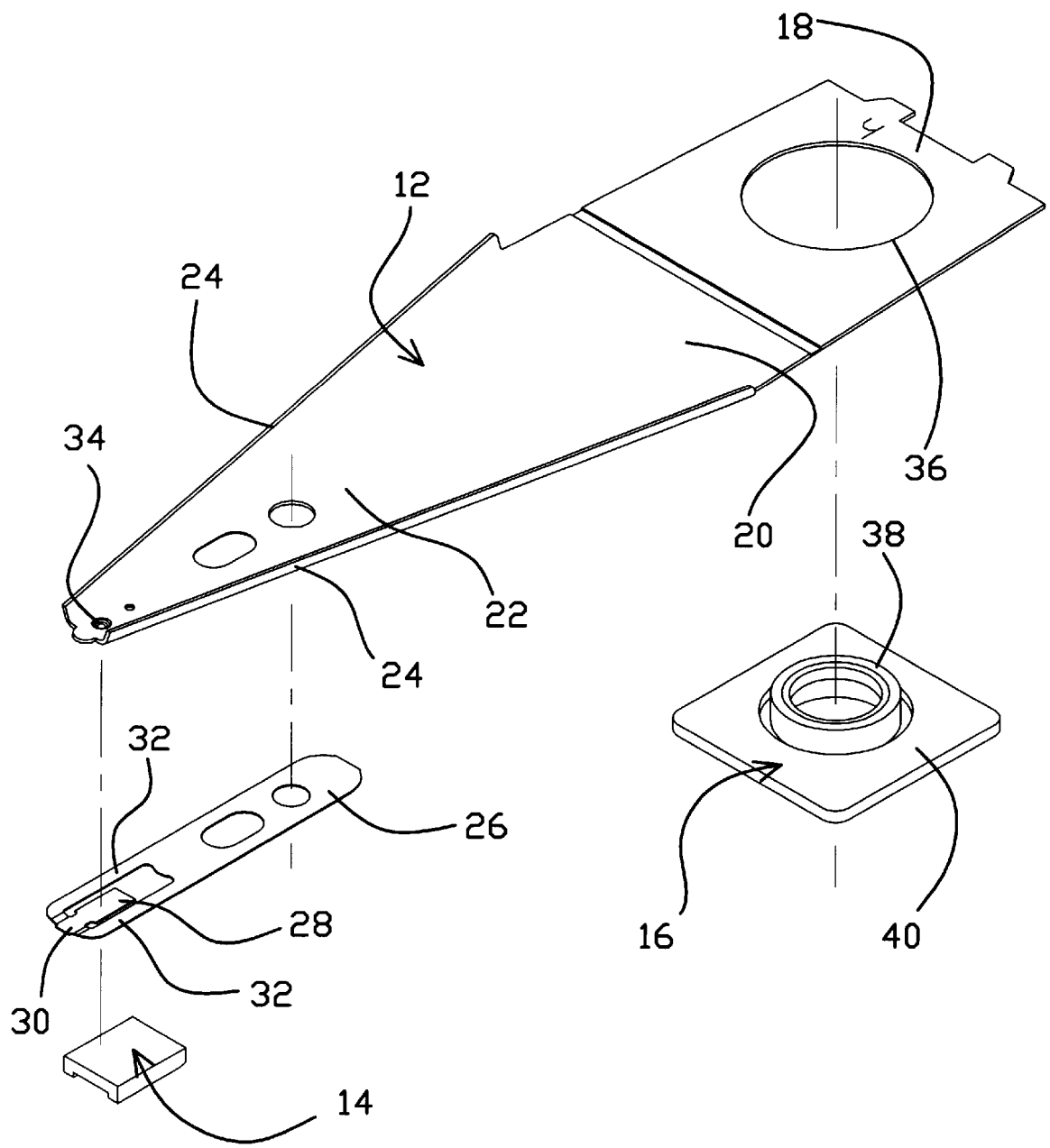
FIG. 2 is an exploded isometric view of the head suspension of FIG. 1 including a load beam, a base plate and a flexure, and a slider for combination with the head suspension.
Figure 3:
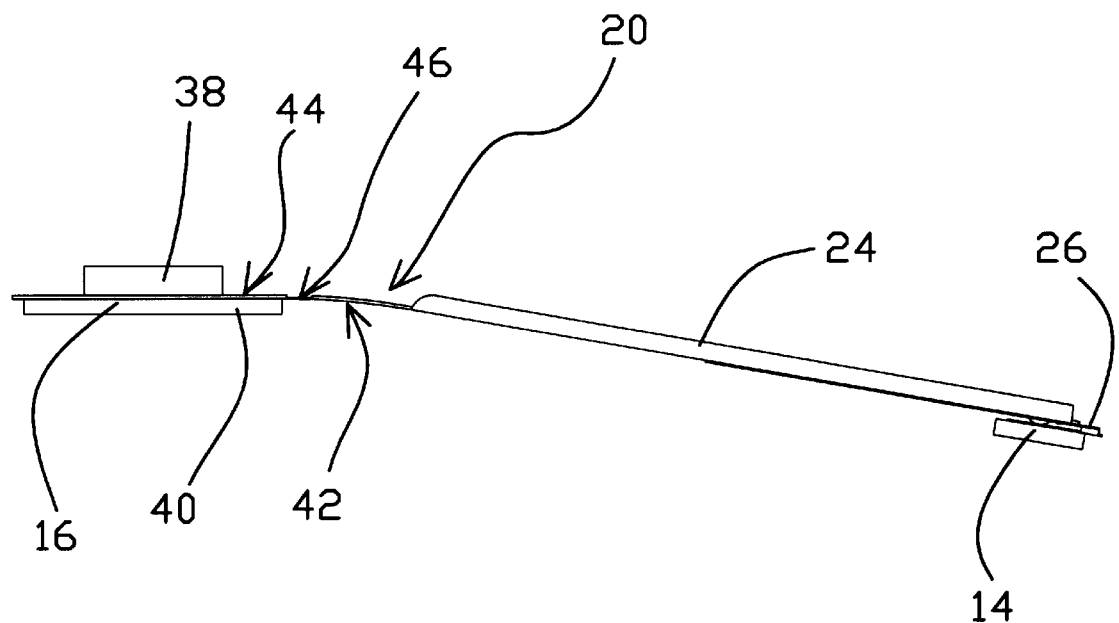
FIG. 3 is a side view of the head suspension of FIG. 1 combined with a slider and in its unloaded state.

With reference to the drawings, wherein like components are indicated with like numerals throughout the several Figures, and initially to FIGS. 1, 2 and 3, a head suspension 10 is illustrated which is particularly designed for use within a rigid disk drive assembly or similar dynamic storage device. The head suspension 10 basically comprises a load beam 12 and a base plate 16, the head suspension 10 to be combined with a conventional slider 14 having a read/write head (not shown), the slider 14 shown in FIGS. 2 and 3.

The load beam 12 is itself comprised of functional portions including a rigid region 18 at least a portion of which is used for mounting the load beam to an actuator (not shown), a spring region 20, and a rigid section 22. The rigid section 22 preferably further comprises stiffening rails 24 which enhance stiffness properties of the rigid section 22 and which are known to be provided in a variety of ways including side rails, such as illustrated, and/or internal rails or channels. The stiffening rails 24 are primarily provided to increase the longitudinal stiffness of the rigid section 22 so as to provide a requisite load or force at the distal tip of the load beam 12 to the slider 14. Stiffening rails 24, however, also affect resonance frequencies of the head suspension 10, specifically in that the cross section across the load beam 12 at any given point affects its resonance frequencies. Stiffening rails 24 are particularly used for increasing the resonance frequency of a lateral bending mode.

A spring connection is provided between slider 14 and the load beam 12 at its distal end by a flexure 26 which permits the slider 14 to move in its pitch and roll directions so that it can compensate for fluctuations of a spinning disk surface. Many different types of flexures, also known as gimbals, are known to provide the spring connection allowing for pitch and roll movement of the slider 14. Any flexure is contemplated to be used with the present invention. Illustrated is one specific example of a flexure 26 having a slider bond pad portion 28 to which the upper surface of slider 14 can be conventionally connected, such as by the use of adhesive or the like. The slider bond pad portion 28 is conventionally provided from a cross piece 30 which is in turn connected with arms 32 further connected with a mounting portion (shown in dashed lines in FIG. 1) of the flexure 26 which is conventionally fixed with the load beam 12, such as by welding. For alignment purposes, the load beam 12 is also provided with a tooling hole 35 that is to be aligned with a similar hole of the mounting portion of the flexure 26 during connection. Also according to this illustrated embodiment, a dimple 34 is provided at the tip of load beam 12 providing a point load from the load beam 12 to the slider bond pad portion 28 so as to provide the requisite load to the slider 14 and to permit the pitch and roll movements of slider 14 and slider bond portion 28 about the dimple 34.

The rigid actuator mounting region 18 can comprise any number of configurations and provides the functional region of the load beam 12 for connecting the load beam 12 to any conventional actuator assembly (not shown) of a disk drive assembly (not shown), whether the actuator is rotational or linear. According to the illustrated embodiment, the actuator mounting region 18 includes a circular opening 36 which is utilized for connecting the load beam 12 to the base plate 16 to enhance the rigid connection of the load beam 12 with an actuator assembly.

Base plate 16 can be conventionally connected with the actuator mounting region 18, such as by welding, and according to the illustrated embodiment, includes a circular collar 38 which fits within the circular opening 36 of the actuator mounting region 18 and a plate region 40 which is preferably connected to the material of the actuator mounting region 18 for enhancing the rigidity of the actuator mounting region 18.

Between the actuator mounting region 18 and the rigid section 22, the spring region 20 is provided. A primary purpose of the spring region 20 is to provide the load at the flexure 26 connected with load beam 12, and specifically to the slider 14. To do this, the illustrated spring region 20 includes a performed bend in the form of a radius 42. In order to provide the desired load, the radius comprises a bend in a rotational direction for functionally biasing the slider 14 toward a disk surface when in use. The degree of the bend and radius 42 are determined on the basis of the requisite load needed for a predetermined offset height so as to counteract the aerodynamic lift force to be generated on slider 14 when flying over a moving disk surface and to establish the fly height of the slider 14. Generally, the greater the amount of bend of the radius 42, the greater the load applied at the flexure 26. The radius 42 can be provided by any conventional bending process, preferably a rolling process over a mandrel or forming die. Moreover, the radius itself can be varied and more than one bend can be provided in the same or opposite rotational directions.

However, as set forth in the Background section of the subject application, the spring region 20 is also of fundamental importance in defining the side longitudinal profile of the head suspension 10 in its loaded state. Moreover, defining the profile is an important manner of controlling torsion resonance frequencies. For example, one object of controlling the profile is to locate an axis of rotation of the head suspension 10 of one or more of the torsional resonant modes to pass through a point which minimizes slider 14 movement. In most cases, that point is the gimballing point of the slider 14. In the illustrated case, that is defined by the contact between the dimple 34 and the contacting surface of the slider bond pad portion 28.

Figure 4:
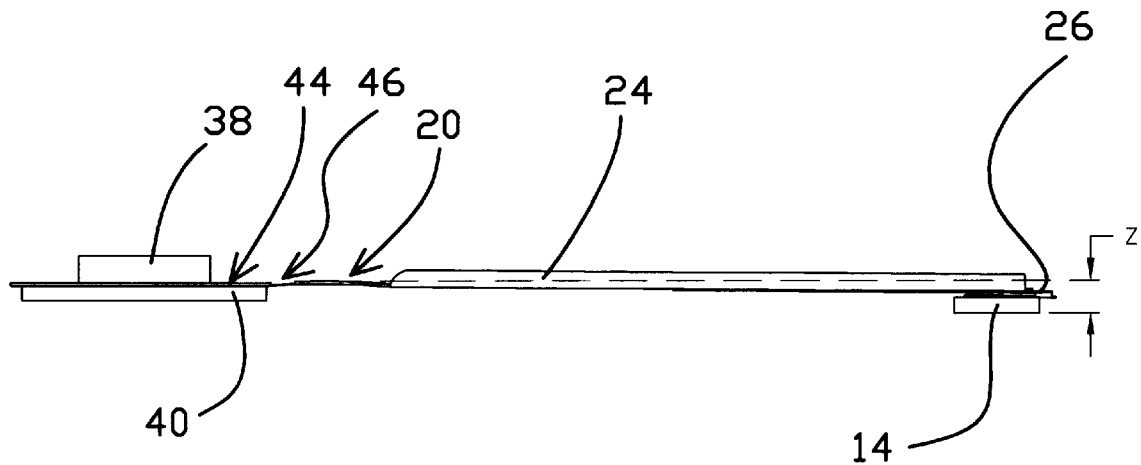
FIG. 4 is a side view of the head suspension of FIG. 1 combined with a slider and in a loaded state.
Figure 6:
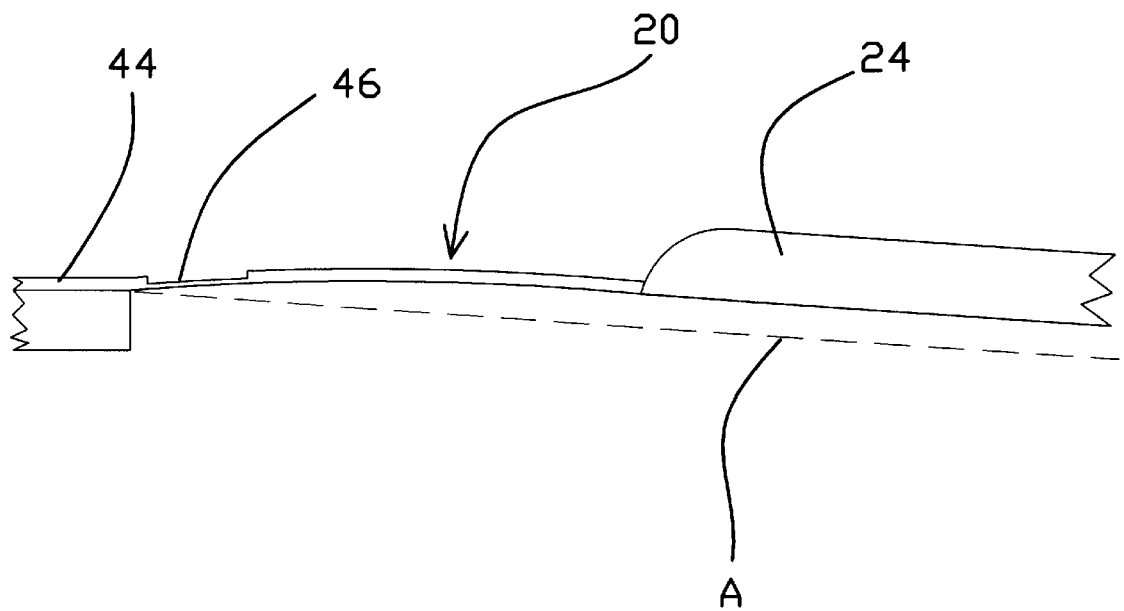
FIG. 6 is an enlarged side view of the spring region of FIG. 4 with the head suspension in a loaded state.

As shown in FIGS. 4 and 6, a loaded profile of head suspension 10 is illustrated. The loaded profile illustrates a profile representative of a design that would be made for a specific application with a predetermined load and offset height and optimized for resonance performance. Offset height, as defined above, is a measure of the vertical distance between where the actuator mounting region 18 and base plate 16 are mounted to an actuator arm (not shown) and the slider mounting surface (the bottom side, in the FIG. 2 orientation) of the slider bond pad portion 28. More specifically, this distance is usually set out as the vertical distance between a clamping surface 44 of the actuator mounting region 18 and the slider mounting surface of the slider bond pad portion 28. Offset height is sometimes set out as Z-height (as shown in FIG. 4) which is the vertical distance between the clamping surface 44 of the actuator mounting region 18 and the bottom surface of the slider that opposes a disk surface in use. Stated in another way, the Z-height includes the offset height, as above, plus the thickness of slider 14 and the thickness of an adhesive layer between the slider 14 and the slider mounting surface of the slider bond pad 28.

For reference purposes, an offset datum line A is partially shown in FIG. 6 which passes through the center of the head suspension 10 at the interface of the rigid base plate 16 and actuator mounting region 18 combination with the spring region 20 and extends (not shown) to the center of the head suspension 10 at the interface of the dimple 34 with the slider bond pad portion 28. Finite element analysis and experimental studies have proven that the profile in terms of this offset datum line A determines the resonance characteristics of the head suspension. Changing load or offset height will not affect the resonance performance of the head suspension 10, if the profile along the offset datum line A is not changed. It is one specific object of the present invention to provide a head suspension 10 wherein its load and/or offset height can be changed within its application range without significantly changing the profile of the head suspension 10 along the offset datum line A.

To accomplish the above, a means is provided within the spring region 20 to permit hinging of a portion of the head suspension 10 from the hinging means to the distal end of the head suspension 10. Preferably, the hinging means is provided within the spring region 20 at a point along its length adjacent to or at the point where the offset datum line A passes through the head suspension 10. By such a positioned hinging means, the profile along the offset datum line A can be independent of the angular position of the profile about the hinging means, at least over the useful application range for which the head suspension 10 is to be designed (i.e. with a given load and offset height). In the illustrated head suspension 10, the point through which the offset datum line A passes is at the interface of the actuator mounting portion 18 and base plate 16 combination with the spring region 20. However, the point could be at any location along the head suspension 10 at which the profile begins. For example, the rigid actuator mounting region 18 can extend longer toward its distal end than needed to provide the actuator mounting portion thereof. If the extended portion is sufficiently rigid, the profile will begin at the interface of the extended rigid portion and an adjacent spring region. In any case, it is the profile defined from the beginning point of the offset datum line A toward the slider which is optimized for a specific application and which is desired to be maintained even if load or offset are varied.

Figure 5:
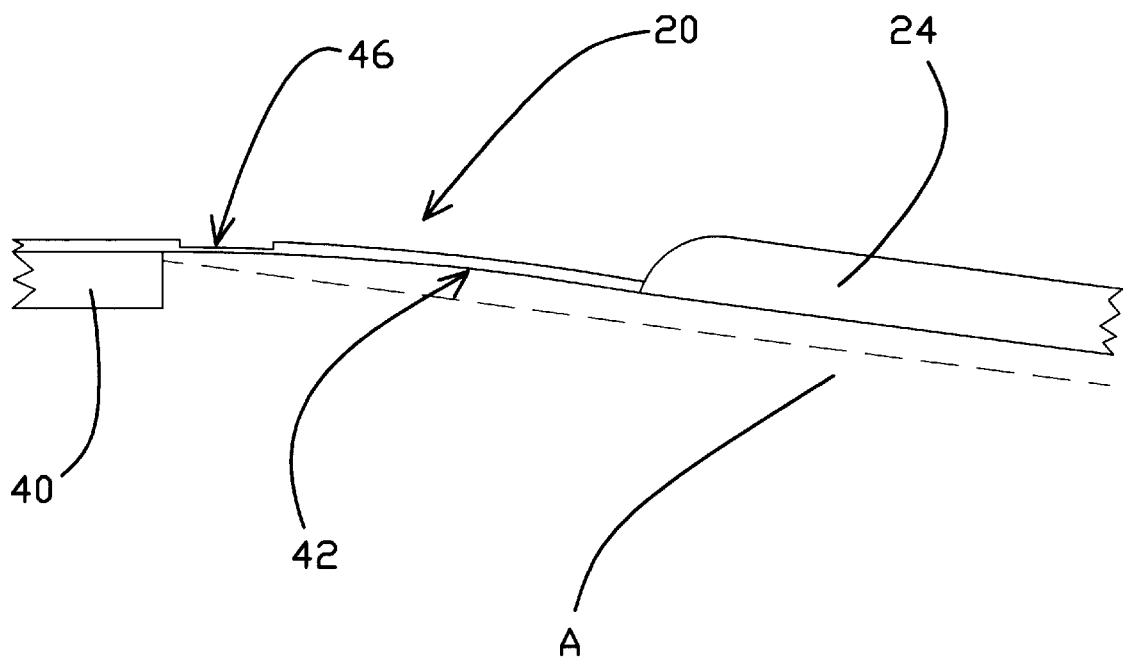
FIG. 5 is an enlarged side view of the spring region of FIG. 3 with the head suspension in an unloaded state.

With reference to FIGS. 2, 3 and 5, one such a means for providing a hinging line is provided by a partial thickness trough 46 that, as shown in FIG. 2, extends entirely across the transverse width of the head suspension 10. Moreover, the trough 46 is located at or just adjacent to the interface between the base plate 16 and the spring region 20. Preferably, such a trough 46 is provided by a conventional etching process, such as used for otherwise defining the dimensions and features of the head suspension 10, as well known in the industry. However, the trough 46 would be controlled to be a partial etch; that is, to extend only partially through the depth of the head suspension 10 material. Any amount of partial etching will to some degree achieve the aforementioned purpose to define a hinge line, but a trough depth of about 30–60% is preferred. Furthermore, the trough 46 can be provided from either side of the material of the spring region 20, whereas a similar effect would be provided. Alternatively, a partial etch can be conducted from both sides to together leave a partial thickness area with a trough on both sides.

As shown in FIGS. 4 and 6, the head suspension 10 is illustrated with a specific profile relative to the offset datum line A. The hinging effect of the partial etched trough 46 defines a transverse axis just adjacent to or at the interface of the base plate 16 and the spring region 20 about which the head suspension 10 in its loaded state can move without substantially affecting its profile. That is, the profile stays substantially the same relative to the offset datum line A even as the height of the slider 14 is changed within an application range about the predetermined offset height. If the hinging line functioned as a true hinge (that is without deformation as its angular position is changed) and which could be locked in its angular position, then the profile would stay the same over its entire range of movement. However, plastic deformation occurs within the area of the trough 46 during a load adjustment. A change in offset height and/or loading substantially provides for the rotation of the profile about the transverse axis defined by the partial etched trough 46 without significantly changing the profile within its application range and thus the performance for resonance characteristics of the head suspension 10.

Figure 12:
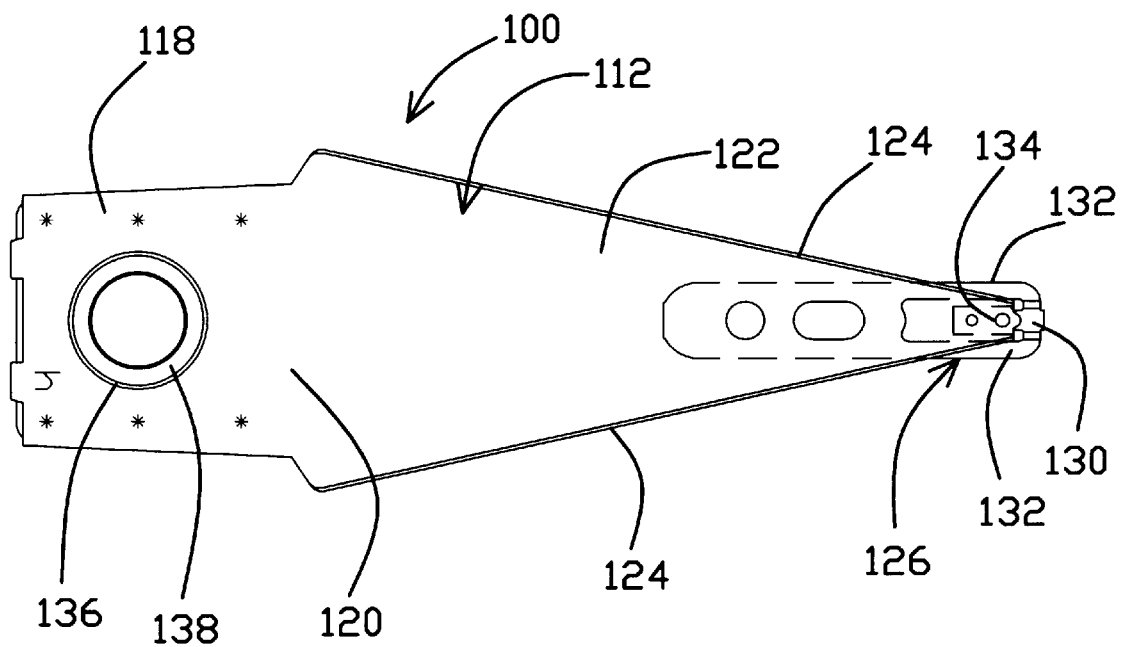
FIG. 12 is a top view of yet another embodiment of a head suspension in accordance with the present invention having a hinge line defined across its spring region by way of a sharp crease or small radius bend.
Figure 13:
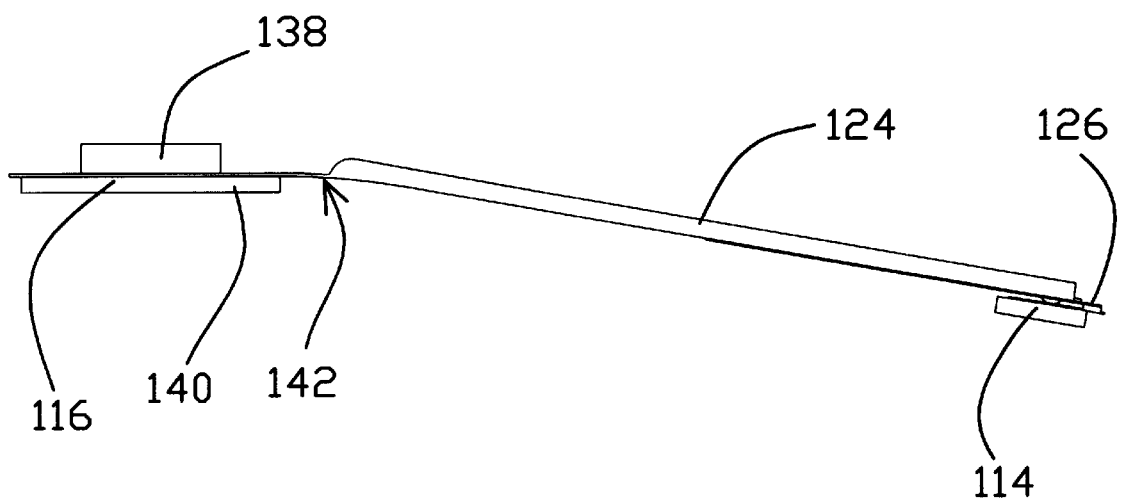
FIG. 13 is a side view of the head suspension of FIG. 12 combined with a slider and in its unloaded state.

Other means are also contemplated for defining the hinging line about which the profile can rotate. Another way to achieve this result would be to limit the spring region 20 to a very narrow region. Specifically, as shown in FIGS. 12 and 13, a very narrow spring region 120 can be defined between the actuator mounting region 118 which is secured with a base plate 116 and the rigid region 122 of the head suspension 100. The rigid region 122 is illustrated with stiffening rails 124 for enhanced stiffening throughout the entire rigid region 122. More preferably, a sharp crease or relatively small radius bend 142 defines the loading within the narrow spring region 120. By this construction, the profile of the head suspension 100 is again defined along an offset datum line A between the bend or small radius 142 and the gimballing point of slider 114. A change in offset height and/or load will not substantially affect the profile along the offset datum line A, since the change would occur along a transverse axis defined by the sharp crease or small radius bend 142 provided at or just adjacent to the interface between the base plate 116 and the spring region 120.

Alternatively, the hinging line can be defined by other types of lines of weakening extending transversely across the spring region as set out above. The hinging line, however, is preferably sufficiently strong to provide the spring force needed, as also set out above, but which may have a relatively low spring rate which is advantageous in thin material head suspensions. For example, a series of holes or perforations can be made in a line across the spring region and positioned as above. Such holes or perforations can be provided by etching or otherwise. As an alternative to the FIGS. 12 and 13 version, the actuator mounting region 118 and rigid region 122 can be stiffened by thicker material or by the provision of one or more additional layers thereon.

Another object of the present invention is the provision of a partial thickness trough, such as trough 46, extending transversely across the entire width of the spring region 20 of the head suspension 10 without regard to position for the purpose of reducing load loss that may result from backbend of the head suspension 10. Load loss, as defined in the Background section, can occur when the slider end of head suspension 10 is raised against the bias provided by the spring region 20. Load loss means simply the amount of the loading force provided by the spring region 20 which is lost due to plastic deformation caused by the back bending within the spring region 20. The decrease in thickness within the trough 46 increases the flexibility of that specific region to reduce load loss; flexibility being the ability to bend without plastic deformation. Moreover, reduced load loss is provided by the trough 46 within the spring region 20 in addition to its ability to provide a deformable hinging line for the decoupling ability, if the trough 46 is positioned as discussed above for that purpose. Moreover, increased flexibility results from the reduction of stress at the top surface (as viewed in FIG. 1), which is the oppositely facing surface from the radius 42. The surface stress is a function of the amount of deflection, the modulus of elasticity of the material, the distance between a transverse neutral axis within the material and the stressed surface, and the width of the trough (the dimension in the longitudinal direction of the load beam 12. A transverse neutral axis is defined within the transverse cross-section of the load beam beneath the trough 46. For that cross-section, the neutral axis extends in the transverse direction and is positioned at about the mid-point of the remaining thickness of the material beneath the trough 46. For a beam without a trough, the neutral axis would be at about the mid-point of the thickness of the untroughed material. By reducing the thickness, such as by trough 46, the distance between the stressed surface and the neutral axis is reduced as compared to a full thickness material. Based upon a known formula for determining stress of a cantilevered beam, the smaller the distance between the neutral axis and the stressed surface, the lower the stress for a given beam at the same deflection. Thus, the smaller distance that results from the provision of the trough 46 translates into less stress and thus more flexibility. In accordance with the present invention, that means less load loss. By comparison, a partial thickness section extending in the transverse direction, but not completely across the width, will shift the neutral axis at least to some degree depending on the percentage of the width reduced in thickness, but does not change the position of the stressed surface at the areas unreduced in thickness. The distance between the neutral axis and the stressed surface is actually increased. Stress will thus be greater in those unreduced areas, which translates into poorer performance in resisting load loss. In accordance with the same stress formula, the greater the width of the trough, the lower the resultant stress for a similar deflection. Thus, for the purpose of reducing load loss, the trough 46 need not be narrowly defined to provide a hinge line, as discussed above.

For the purpose of combining the advantages of reduced load loss and decoupling, as discussed above, it is an especially advantageous design to provide the trough 46 entirely across the transverse width to reduce load loss, and to provide a relatively narrow trough 46 at or just adjacent to the interface of the base plate 16 with the spring region 20 to decouple the profile from load and/or offset height. The reduced thickness of trough 46 also lessens the spring rate of the spring region 20, which can be advantageously utilized in suspension assemblies requiring low loading forces. Moreover, by the present invention, such low loading forces can be accommodated while the remaining portion of the suspension 10 can be optimized for profile and resonance characteristics.

In the FIGS. 1–6 embodiment, the partial etched trough 46 is used in combination with a radius 42 provided within the spring region 20. The radius 42 is designed to provide the proper loading required for the specific application and also to optimize the profile of the head suspension 10 for resonance characteristics. The optimizing of the head suspension for resonance characteristics does not form a particular part of the subject invention. Many different techniques have been developed for optimizing the profile of the loaded head suspension, and any can be used in accordance with the present invention. The present invention adds to this the ability to optimize the head suspension with minimal regard to how the offset height and/or load may be altered, since the profile will not be significantly changed by any such alteration that is likely to occur. Alternatively, in the embodiment of FIGS. 12 and 13, the use of a sharp crease or small radius bend as the radius 142 within a relatively narrow spring region can provide both the hinging function and the loading force.

With reference now to FIGS. 7–11, another embodiment of a head suspension 200 in accordance with the present invention is illustrated. Head suspension 200 includes a load beam 212, a slider 214, and a base plate 216. The load beam 212 comprises an actuator mounting region 218, a spring region 220, a rigid section 222 having stiffening rails 224, and a flexure 226. Flexure 226 is similar to flexure 26, described above, and includes a slider bond pad portion 228 connected with a cross piece 230, which is in turn connected with arms 232. Flexure 226 is illustrated as formed as a separate element from the load beam 212 and is conventionally fixed thereto, such as by welding. A tooling hole 235 is also preferably provided through load beam 212 within its rigid region for use in aligning a similar hole of the flexure 226 during connection. A dimple 234 is provided, as conventionally known, having a convex surface for contacting a surface of the slider bond pad portion 228, and for providing the load to and permitting the pitch and roll movement ability to the slider 214 and slider bond pad portion 228. The actuator mounting region 218 also is provided with an opening 236 within which a circular collar 238 of the base plate 216 passes and which is secured with a plate region 240 of the base plate 216. The plate region 240 is conventionally fixed with the actuator mounting region 218 of the load beam 212, such as by welding.

Within the spring region 220, a hinge line is defined by a partial etched trough 246, which like trough 46, described above, is preferably provided at or adjacent to the interface between the base plate 216 and the spring region 220. The effect of the partial etched trough 246 is to decouple the profile of the head suspension 200 in its loaded state from the offset height and/or load provided to the head suspension 200. Moreover, the partial etched trough 246 advantageously reduces load loss associated with back bend of the spring region 220. The decoupling function and load loss reduction are similar to that described above with regard to the first embodiment. As an additional feature, the reduced thickness area of the trough 246 may include an open area 247 defined entirely through the thickness of the spring region material. More than one open area can be provided. If provided, such an open area 247 is preferably centrally positioned along the transverse axis to maintain balance. One or more open area 247 can be utilized for assisting in defining the hinge line to provide the decoupling function. Moreover, the open area 247 can be used to lower the spring rate.

Figure 7:
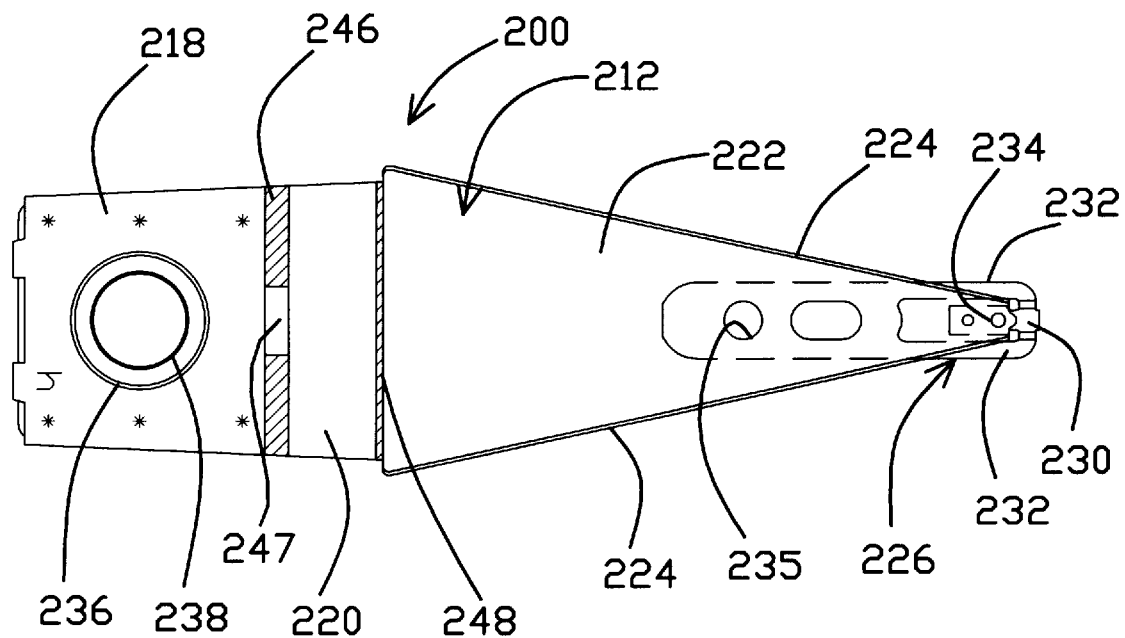
FIG. 7 is a top view of another head suspension in accordance with the present invention having plural partial etched troughs traversing the spring region of the head suspension, one for providing a hinge line and another for defining the head suspension profile.
Figure 8:
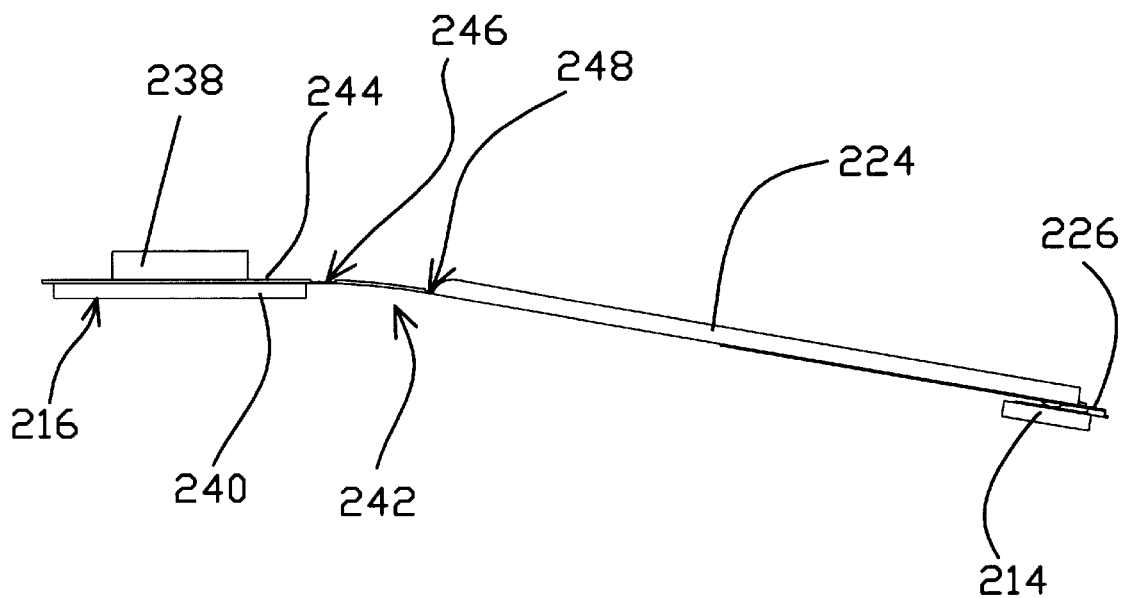
FIG. 8 is a side view of the head suspension of FIG. 7 combined with a slider and in its unloaded state.
Figure 9:
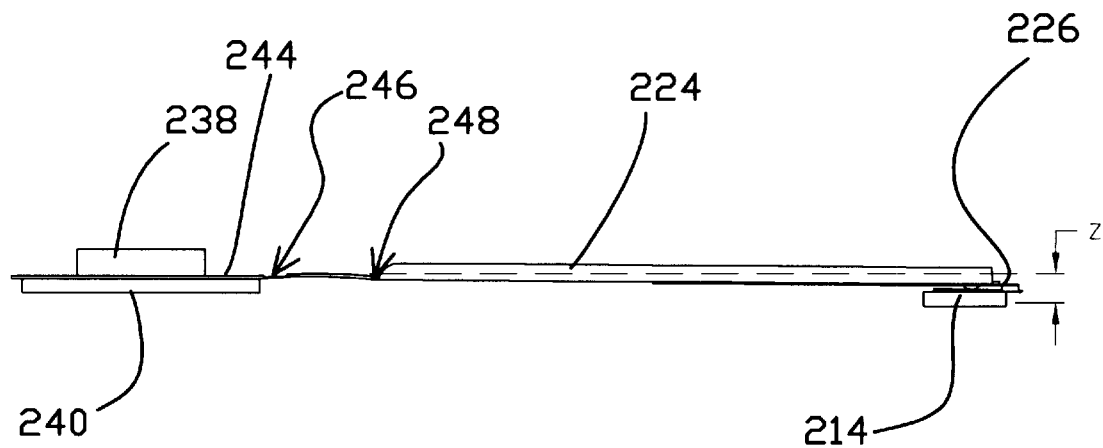
FIG. 9 is a side view of the head suspension of FIG. 7 combined with a slider and in a loaded state.
Figure 10:
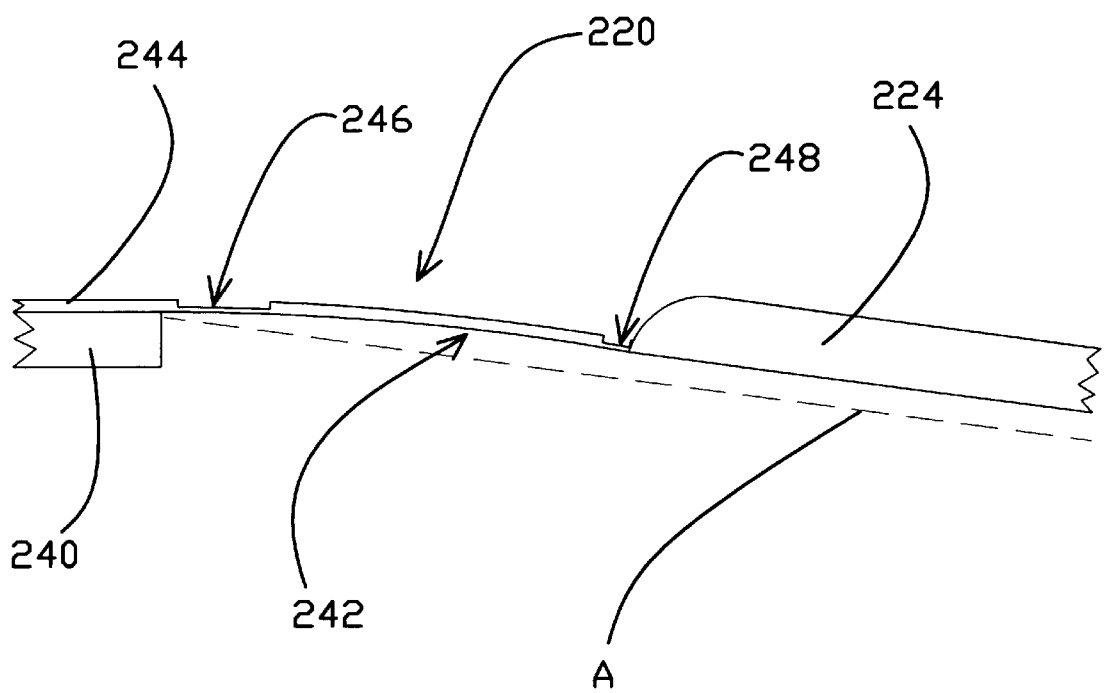
FIG. 10 is an enlarged side view of the spring region of FIG. 8 with the head suspension in an unloaded state.
Figure 11:
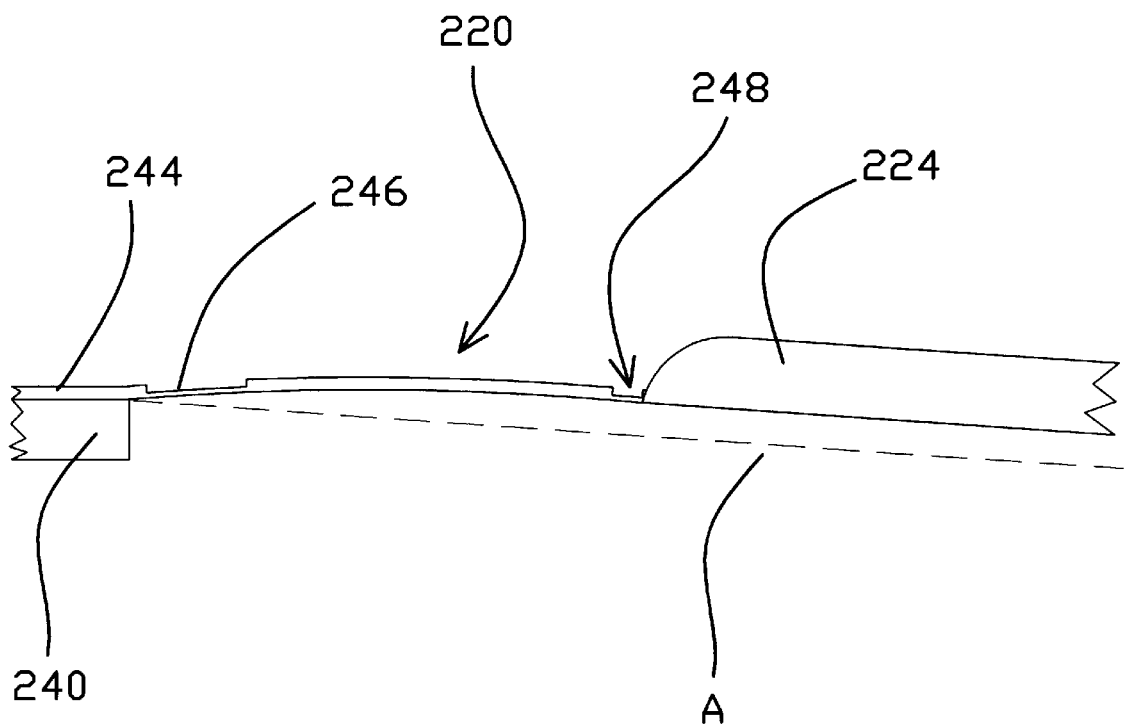
FIG. 11 is an enlarged side view of the spring region of FIG. 9 with the head suspension in an loaded state.

An additional feature of the FIGS. 7–11 embodiment is the provision of a second trough 248 also within the spring region 220. Preferably, the trough 248 is also provided by a partial etching process. The purpose of the partial etched trough 248 is to permit the formation of a controlled reverse bend in the loaded profile of the head suspension 200, as illustrated in FIG. 9. The specific purpose of providing a bend in an opposite direction than the spring force generating bend of the radius 242, is in the optimization of the profile. The optimization of a suspension profile using such a bidirectional bending technique is fully disclosed and described in copending U.S. patent application Ser. No. 08/623,504 to Jagt et al. which is commonly assigned to the assignee of the present invention, and the entire disclosure of which is incorporated herein by reference. In short, the provision of the bend provided by the second partial etched trough 248 is in the ability to control profile, such as to obtain a desired z-height that is determined, empirically or otherwise, to optimize the profile of the head suspension 200 for improved resonance performance. By combining that feature with the present invention, once the profile is optimized, the first partial etched trough 246 decouples that profile which has been optimized from the offset height and/or load provided to the head suspension 200. Preferably, the load is provided by the radius 242 between the troughs 246 and 248. Alternatively, the first partial etched trough 246 can be combined with a second pre-bend provided at the location of the second trough 248 instead.

As above, the trough 246 also reduces load loss of the head suspension 200 when the spring region 220 is subjected to a backbend. The addition of a second trough 248 adds to this advantage. That is, both the first and second troughs 246 and 248, respectively, increase the flexibility of the spring region 220 within the thicknesses of each of the troughs 246 and 248. The combination effect is cumulative. Thus, even better load loss results are obtained.

Figure 14:
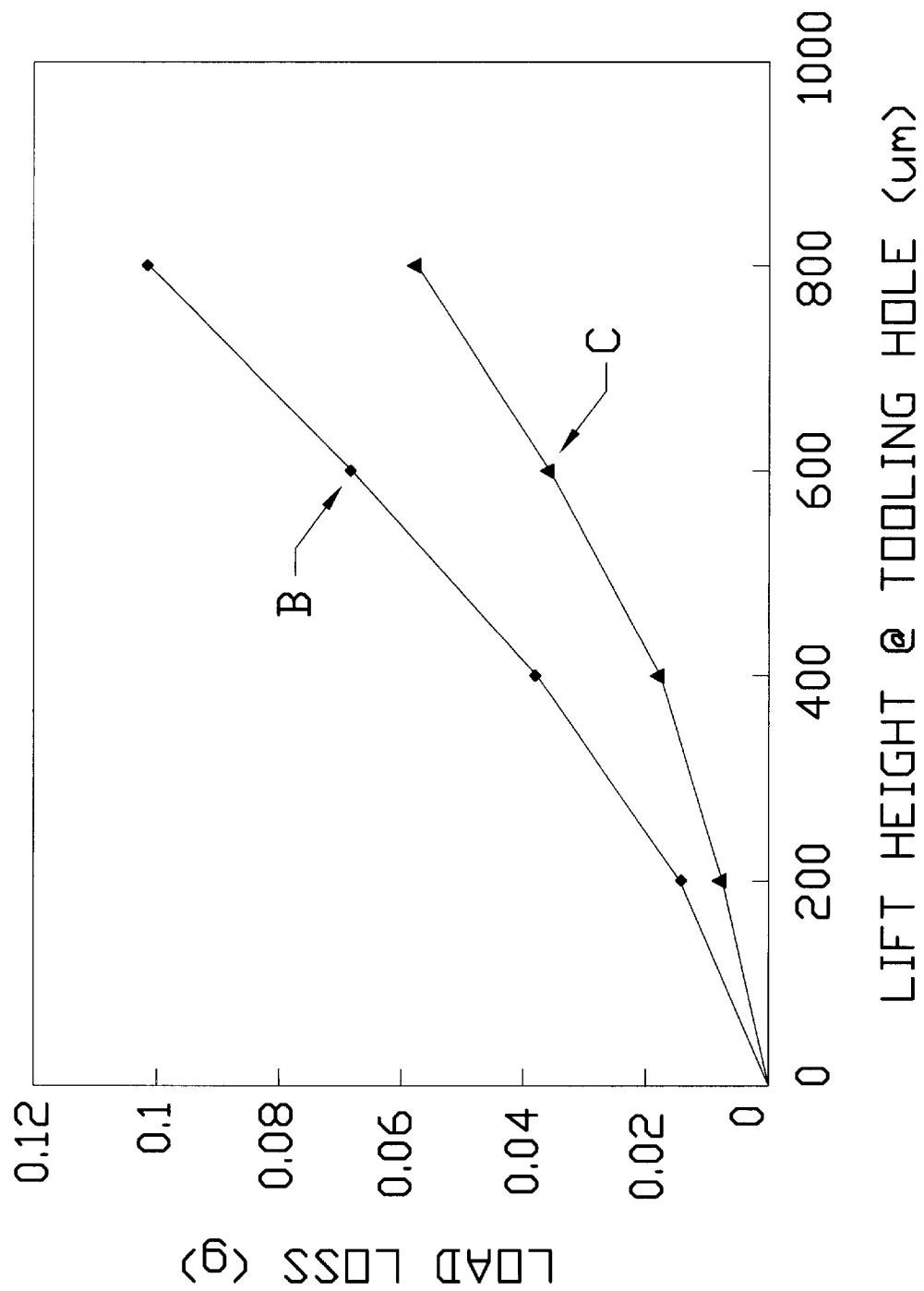
FIG. 14 is a graphical representation showing a comparison of load loss of a troughed head suspension in accordance with the present invention to a similar but non-troughed head suspension when lifted to various heights.

A comparison of load loss results of a head suspension design such as illustrated in FIGS. 7 and 8 and a similarly designed head suspension but without either trough 246 or 248 is illustrated in the graph of FIG. 14. The non-troughed version of the head suspension that was tested was a commercially available head suspension identified as a T850 model available from Hutchinson Technology Inc. of Hutchinson, Minn., the assignee of the present invention. The head suspension in accordance with the present invention that was tested comprised a similar T850 model head suspension but including both of the partial etched troughs 246 and 248, as described above. Specifically, the trough 246 was located 10.08 mm from the tooling hole 235 having a width of 0.50 mm and a depth of 0.038 mm. The second trough 248 was provided at 7.74 mm from the tooling hole 235 having a width of 0.15 mm and a depth of 0.038 mm. The material thickness of the load beam was 0.0762 mm. A like number of each head suspensions were provided and tested as follows.

For this test, each of the troughed and untroughed head suspensions was designed to have a loading of 3.0 grams at an offset height of 0.305 mm. Tests were conducted by lifting each head suspension at its tooling hole 235, see FIG. 7, after the head suspension was mounted and provided in its loaded state. The amount of lift to each head suspension at the tooling hole 235 is indicated along the X axis of FIG. 14. The measured load loss in grams is indicated on the Y axis. Curve B represents load loss at the various lift heights for a non-troughed head suspension. Curve C represents the load loss performance at the various lift heights for the head suspension design having both first and second partial etched troughs 246 and 248. Curve C evidences a clear trend of less load loss resulting from similar lift heights and also a lower rate of increase of load loss as lift heights are increased as compared to the curve B.

Figure 15:
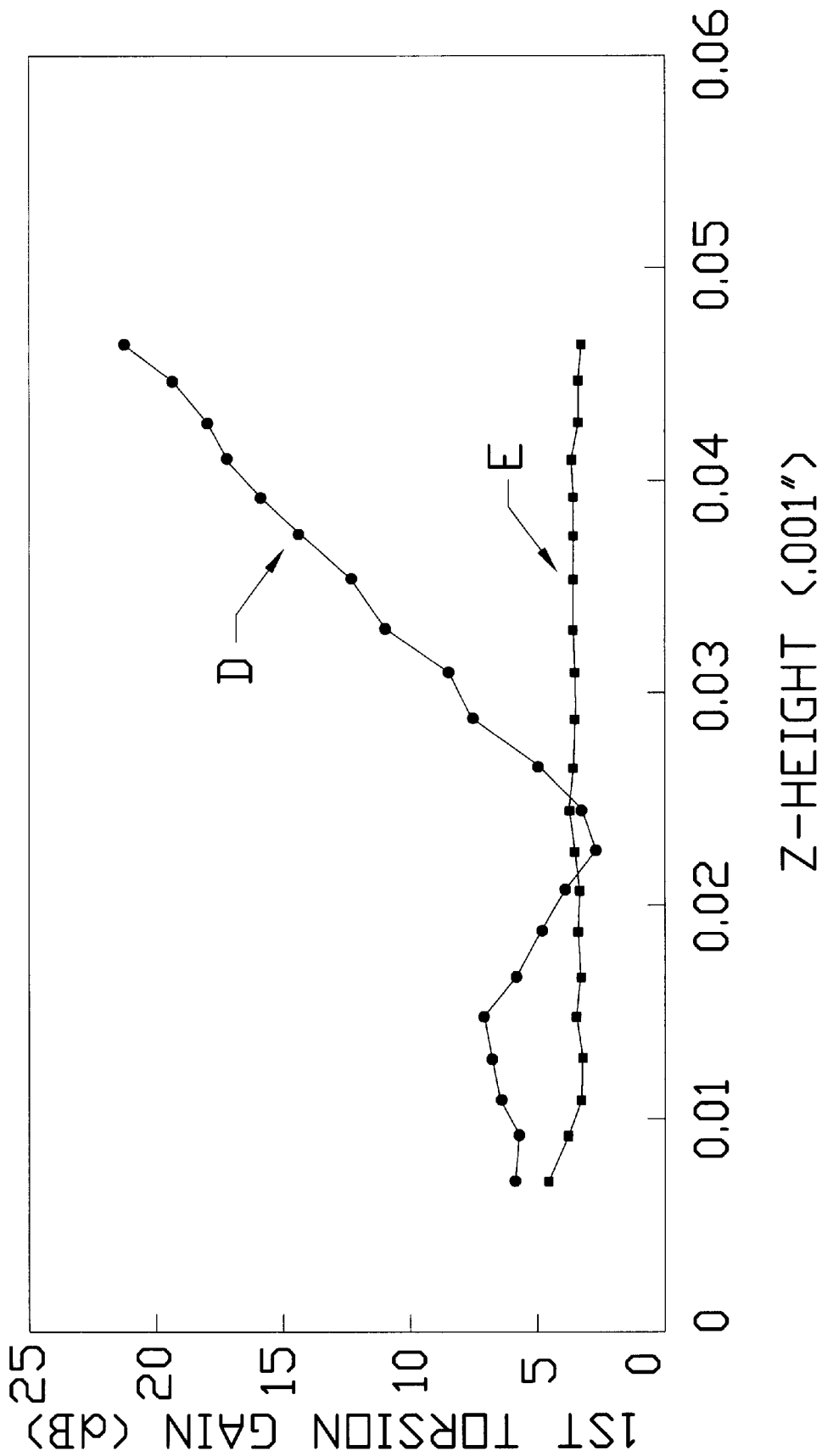
FIG. 15 is a graphical representation showing a comparison of first torsion gain of a troughed head suspension in accordance with the present invention to a similar but non-troughed head suspension as offset heights (represented in terms of Z-heights) are varied.

Comparative performance tests were also conducted comparing the change in offset height to resonance performance. The graph shown in FIG. 15 compares resonance performance of a non-troughed T850 head suspension available from Hutchinson Technology of Hutchinson, Minn. to a similar T850 head suspension design but having both the partial etched troughs 246 and 248, as described above. Line D represents performance of a non-troughed head suspension, while line E represents the performance of the design having both troughs 246 and 248. Specifically, along the X axis, the offset is represented as Z-height which, as detailed above, equals the offset height plus the distance from the contact of the dimple with the slider bond pad surface to the bottom surface of the slider. Along the Y axis, gain associated with first torsional resonance frequency is indicated. In testing each design, the Z-height was varied and the head suspension was subjected to its first torsional resonance frequency, and the gain was measured at the slider end of the head suspension.

Line D, as shown in FIG. 15, is representative of a portion of a trend analysis of gain at resonance frequency as Z-heights are changed for a head suspension. The portion shown is a right side portion of a typical curve; the left side of which (not shown) would likely be similar, but in mirror image. This type of analysis provides a range between the low points (the notch) where it is usually desirable to control the Z-height to minimize torsional gain.

Line E shows the decoupling effect of the present invention in that over the same Z-height range as that of line D, change in torsion gain is substantially eliminated. Thus the hinging effect caused by the provision of the trough 246 allows Z-heights to be varied without substantially changing profile, which is directly related to torsion gain. The range over which there is insubstantial change is defined as its application range, which, as shown is larger than the notch width for an untroughed suspension. It is apparent that at some limit, further changing of the Z-height will significantly affect the profile. The limit, however, is outside the useful application range of the head suspension. The head suspension design would preferably be set at a Z-height in the middle of the useful range so that changes to the offset height, whether intentional or not, would have little or no affect. By the present invention, the notch of the trend analysis is clearly widened and flattened.

Figure 16:
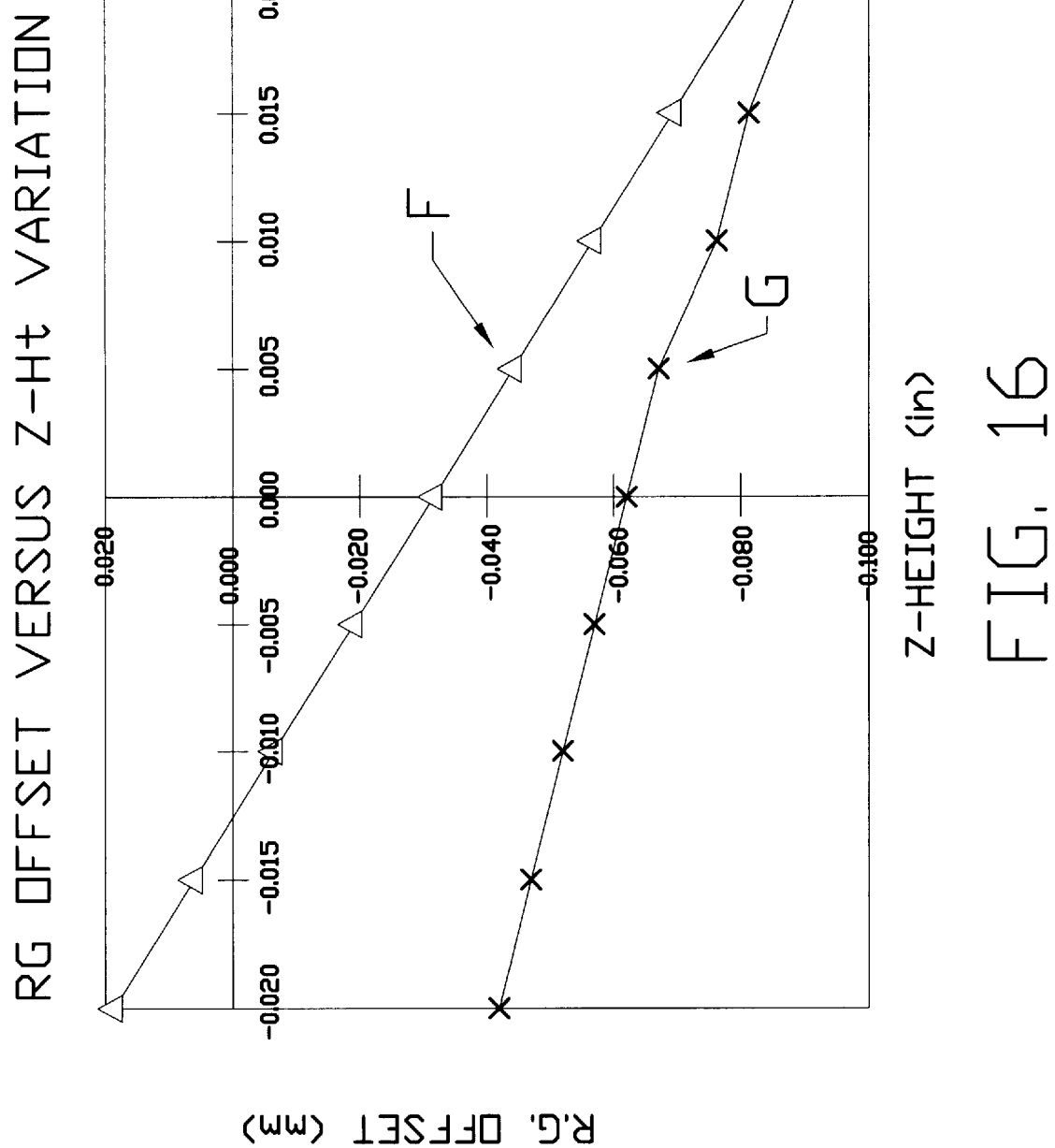
FIG. 16 is a graphical representation showing a comparison of a radius geometry value of a troughed head suspension in accordance with the present invention to a similar but non-troughed head suspension as offset heights (represented in terms of Z-heights) are varied.

Another test comparing resonance performance with Z-height variations was modeled for the design of the FIGS. 1–6 embodiment having but a single trough 46. Specifically, the trough 46 was provided in a T850 design model head suspension available from Hutchinson Technology of Hutchinson, Minn., with the trough located 10.33 mm from the tooling hole 35 having a width of 0.70 mm and a depth of 0.038 mm. The material thickness of the load beam was 0.0762 mm. The results of the modeled test are shown in FIG. 16. Along the X axis, Z-height is indicated. Along the Y axis, a radius geometry value is indicated. The radius geometry value is a functional measure of what the loaded radius design is. Specifically, it is a measurement of the distance between the offset datum line, such as shown in FIG. 6 by line A, and the load beam surface at a specific location along the line within the radius region, such as measured from a fixed point like the tooling hole 35. For this example, the radius geometry value was measured at a point 7.62 mm from the tooling hole 35. A similar radius geometry value indicates a similar radius profile. As above, the profile determines the resonance performance of a head suspension. Line F shows a non-troughed design. Line G shows a design having the single trough, as described above. The slope of line G is significantly less than the slope of line F within the useful application range of the head suspension. The lower the slope of the line, the greater the stability in torsional gain.

Additional head suspension examples have also been modeled with variations of the trough width and thickness of the trough area. In each case, an 850 model head suspension was provided with a single trough at 10.27 mm from the tooling hole. Moreover, a design criteria was to provide a spring rate between 18 and 20 N/mm. Table 1 below summarizes certain specifications of a number of examples of design variants.

TABLE 1

| Design No. | Trough Width (mm) | Trough Area Thickness (mm) | Area Removed from Center (mm$^2$) | Load Beam Spring Rate (N/mm) |
|---|---|---|---|---|
| 1 | 0.28 | 0.03 | 0.0 | 19.9 |
| 2 | 0.25 | 0.03 | 0.0 | 18.4 |
| 3 | 0.30 | 0.03 | 0.35 | 18.0 |
| 4 | 0.30 | 0.04 | 0.7 | 20.3 |

Figure 17:
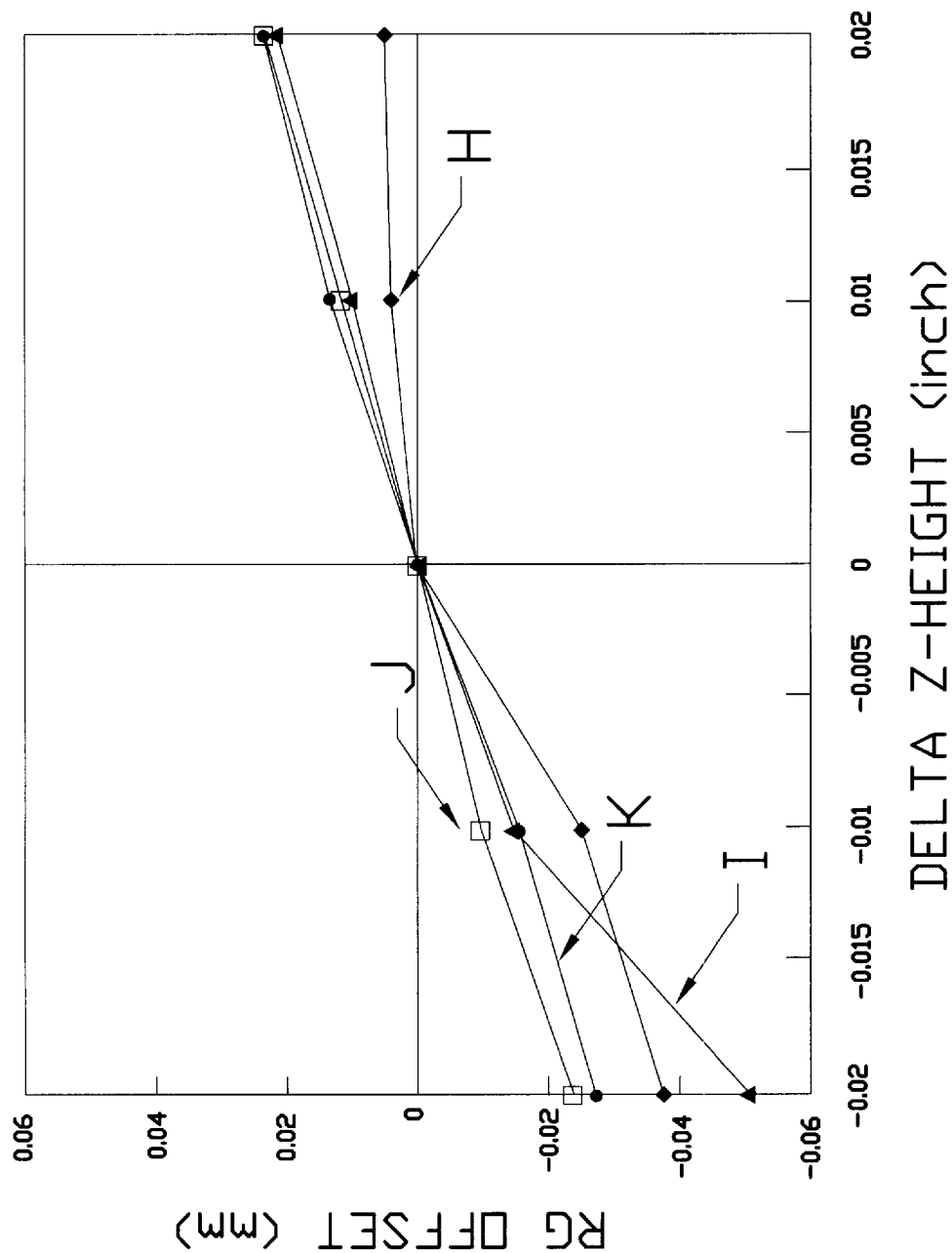
FIG. 17 is a graphical representation showing a comparison of a radius geometry value of the various troughed head suspensions as set out in Table 1 as offset heights (represented in terms of Z-heights) are varied.

For each of the above design examples, a Z-height variation plot was made and is illustrated in FIG. 17. Specifically, lines H, I, J, and K represent the radius geometry value as Z-heights are varied for each of designs 1–4, respectively.

From the above, it is evident that there is less change in the radius geometry value over the same Z-height changes for each of the modified designs than for the nontroughed example of FIG. 16 represented by line F. A comparison on the slopes of each line show a significantly reduced slope for the various lines representing troughed spring region designs. Note that the direction of the slope, upward to the left or right in FIGS. 16 and 17, respectively, is merely a matter of sign convention and are directly comparable as absolute values.

By the present invention, spring rates, load loss and resonance performance can be controlled in many ways including the specific combinations set out above. The examples, both actual and modeled, clearly support improvements in controlling load by decoupling resonance performance with loading over the application range for a particular design and by reducing the affect of backbending and thus load loss.

We claim:

1. A head suspension to be connected to an actuator of a rigid disk drive and for supporting a magnetic head, said head suspension including a load beam that comprises:
   a first rigid section;
   a second rigid section between said first rigid section and an end of said load beam distal from said first rigid section;
   a flexure at the distal end of said load beam and including a slider bond pad to which a slider is to be mounted and which permits flexure of a slider when mounted thereto; and
   a spring region between said first rigid section and said second rigid section including a bend for providing a desired load to a slider when mounted to said slider bond pad in a loaded state of said head suspension at a predetermined offset height and for defining a longitudinal profile of said head suspension in its loaded state, said spring region further having a hinging means for permitting the offset height to be varied from its predetermined position without substantially changing the longitudinal profile of said head suspension, said hinging means defining a hinge line located substantially at an interface of said spring region and said first rigid section.

2. The head suspension of claim 1, wherein said spring region is directly connected with said first rigid section and said bend is provided distally of said hinge line.

3. The head suspension of claim 1, wherein said hinging means comprises said bend and said second rigid section is directly connected with said spring region.

4. The head suspension of claim 2, wherein said hinging means comprises a trough of reduced material thickness extending completely across said spring region in the transverse direction of said head suspension.

5. The head suspension of claim 4, wherein said bend is positioned along said spring region between said trough and said second rigid section.

6. The head suspension of claim 5, further comprising a second trough of reduced material thickness extending across said spring region in the transverse direction of said head suspension, said second trough positioned between said hinging means and said second rigid section.

7. A head suspension to be connected to an actuator of a rigid disk drive and for supporting a magnetic head, said head suspension including a load beam that comprises:
   a first rigid section having an actuator mounting region for connection to an actuator;
   a second rigid section between said first rigid section and an end of said load beam distal from said actuator mounting region;
   a flexure at the distal end of said load beam and including a slider bond pad to which a slider is to be mounted and which permits flexure of a slider when mounted thereto; and
   a spring region between said first rigid section and said second rigid section including a bend for providing a desired load to a slider when mounted to said slider bond pad in a loaded state of said head suspension at a predetermined offset height and for defining a longitudinal profile of said head suspension in its loaded state, said spring region further having a trough of reduced material thickness extending completely across said spring region in the transverse direction of said head suspension.

8. The head suspension of claim 7, wherein said spring region is directly connected with said first rigid section and said trough is provided substantially at an interface of said spring region and said first rigid section so as to provide a hinging means for permitting the offset height to be varied from its predetermined position without substantially changing the longitudinal profile of said head suspension.

9. The head suspension of claim 7, wherein said bend is positioned along said spring region between said trough and said second rigid section.

10. The head suspension of claim 9, further comprising a second trough of reduced material thickness extending across said spring region in the transverse direction of said head suspension, said second trough positioned between said bend and said second rigid section.

11. A head suspension to be connected to an actuator of a rigid disk drive and for supporting a magnetic head, said head suspension including a load beam that comprises:
   a first rigid section having an actuator mounting region for connection to an actuator;
   a second rigid section between said first rigid section and an end of said load beam distal from said actuator mounting region;
   a flexure at the distal end of said load beam and including a slider bond pad to which a slider is to be mounted and which permits flexure of a slider when mounted thereto; and
   a spring region between said first rigid section and said second rigid section including a bend for providing a desired load to a slider when mounted to said slider bond pad in a loaded state of said head suspension at a predetermined offset height and for defining a longitudinal profile of said head suspension in its loaded state, said spring region being directly connected with said first rigid section and further including a hinging means defining a hinge line provided substantially at an interface of said spring region and said first rigid section, wherein said bend is positioned along said spring region between said hinge line and said second rigid section.

12. The head suspension of claim 11, wherein said hinging means comprises a trough of reduced material thickness extending completely across said spring region in the transverse direction of said head suspension.

13. The head suspension of claim 12, further comprising a second trough of reduced material thickness extending across said spring region in the transverse direction of said head suspension, said second trough positioned between said hinging means and said second rigid section.

* * * * *